Patented Nov. 14, 1950

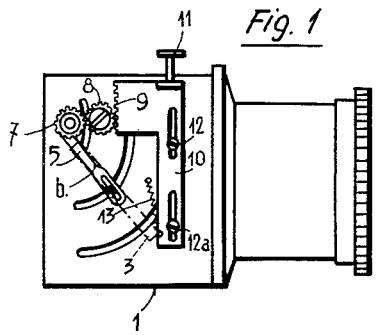

2,529,757

UNITED STATES PATENT OFFICE 2,529,757

REFLEX CAMERA, INCLUDING MIRROR GUIDES AND RESILIENT STOP MEMBER

Georges Baer, Paudex Lausanne, Switzerland, assignor to Pignons S. A., Ballaigues, a corporation of Switzerland Application May 14, 1947, Serial No. 747,966
In Switzerland July 16, 1946

8 Claims. (Cl. 95—42)

As is known, photographic apparatus with a retractable "reflex" mirror are provided generally with a plane mirror directed during the viewing operation substantially at 45° relatively to the axis of the objective so as to reflect the image, projected by the latter onto a frosted glass mounted substantially perpendicularly to the plane occupied by the sensitised photographic layer.

An instant before taking the view, that is to say before exposing the photographic layer to the luminous rays, the mirror is retracted: it is caused to rock out of the beam of rays projected by the objective so as to enable these latter to form the desired image of the subject on the photographic layer.

It will be obvious in particular when it is desired to reduce as far as possible the dimensions of the packed apparatus, that it is necessary to be able to telescope the objective towards the interior of the apparatus before packing. This is only possible by moving the mirror so as to provide space for the mounting of the objective.

For facilitating the understanding of the description, it may be useful to recall the various conditions which are difficult to achieve simultaneously and which must be satisfied:

1. Reduction to a minimum of the overall dimensions of the packed apparatus necessitating
2. The telescoping of the objective towards the interior of the apparatus which involves
3. The retraction of the mirror from out of the space occupied by the mounting of the objective when the apparatus is in the packed position.
4. Simplicity and robustness of the control for the recoil movement of the mirror, which should not in any way affect
5. The easy retraction of the mirror (for the passage from one position to the other of viewing and photographing the view) preferably by means of the actuating lever or knob, or
6. The rigorous determination of the viewing position of the mirror when the latter is returned by the combined set of actuating members with the stop members, an error of a few hundredths of a millimetre in the position of the mirror or of a few minutes in its direction being capable of causing substantial errors in setting of framing in apparatus "of small size" in particular.
7. Protection of the mirror against possible consequences due to a too sudden release of the actuating lever or knob so that a shock resulting from such an error of manipulation does not produce an accidental movement of the mirror in its support or in its frame.
8. Shutting off by the mirror support every infiltration of light into the apparatus by the viewing device, when the mirror is in its position for taking a view.
9. Impossibility of releasing the shutter when the objective has not been moved out into the position for photographing.

Some manufacturers have been satisfied in using the retracting movement of the mirror (from its viewing position to that for photographing) for providing the necessary space for the mounting of the objective during the telescoping of the latter towards the interior of the apparatus. This necessitates a device for locking the mounting of the objective in its forward position whilst the mirror is in the viewing position and a device for stopping the control of the movement of the mirror for holding the latter in the retracted position. This stop device at the same time effects the withdrawal of the device for locking the mounting of the objective. If, during current practice at the end of the retraction of the mirror, the same control effects the release of the shutter of the apparatus, it is also necessary to move the mirror so as to allow the telescoping of the objective, for the control of the mirror to be disconnected from the release of the shutter in order to avoid an accidental exposure of the sensitised material.

It will be seen readily that such a mechanism involves considerable complication of the apparatus and an increase in its cost of manufacture.

On the other hand when the mirror is retained in its retracted position as hereinafter described, there is nothing to prevent the shutter from being released even though the objective is still in its telescoped position, that is to say is in its operative position, which constitutes a serious disadvantage by reason that the photograph taken under these conditions is of no value as the setting has not been effected.

The present invention provides means for obviating these disadvantages.

It has for its subject a device for controlling the "reflex" mirror of photographic apparatus which, during the telescoping of the objective, is moved towards the interior of the apparatus. It is distinguished from other devices of this type by the fact that the mirror is held in its exact viewing position by a resilient device, against stops, in such a manner that during the telescoping of the objective towards the interior of the apparatus, the internal portion of the objective support directly actuates the mirror support against the action of the said resilient device and pushes the mirror towards the interior whilst moving it away from the said stops.

One form of construction of the device forming the subject of the invention, as also cinematic diagrams of the movements of the "reflex" mirror of the apparatus shown, are shown by way of example in the accompanying drawing, wherein—

Fig. 1 is a profile view of one form of construction.

Fig. 2 is a rear view.

Fig. 3 is a profile view of the other side, and

Fig. 4 is a plan view.

Fig. 5 shows diagrammatically a cinematic of the movements of the mirror of the form of construction shown in Figs. 1 to 4.

Figs. 6 and 7 show the cinematic of the movements of the "reflex" mirror according to two different modifications of the form of construction shown in Figs. 1 to 4.

Referring to Figs. 1 to 5, the device comprises a framework 1 on which the objective support 2, of tubular form is mounted in a sliding or telescoping manner along its axis so as to be capable of entering the framework 1. A mirror support 3, for a plane "reflex" mirror, is mounted in a rotatable manner about an imaginary axis which may be located outside the framework and of which a trace is shown at 4 in the plane of the drawing in Fig. 5. The mirror support, on each of its sides, is provided with three guide pins engaging with three separate guides or grooves I, II and III, provided in the lateral walls of the framework along concentric arcs of a circle. At their lower end, the grooves II and III are each extended by an arc of a circle having its centre at 5, end of the first groove, so as to enable the mirror to be pushed back into the back of the framework and allow the objective support to enter.

When the objective support has entered, it occupies the position 2' and the mirror support assumes the position 3' (Fig. 3), these two positions being shown in broken lines.

The central lateral pins, of which the axis passes substantially through the centre of gravity of the assembly formed by the mirror and the mirror support, also engage with a substantially radial groove provided in each of two lateral arms b mounted rigidly on a traverse spindle 6. A pinion 7 is secured to one end of the spindle 6. The pinion gears with an intermediate pinion 8 which itself gears with a rack 9 of a slide 10 provided with an actuating lever or push button 11. The slide is guided by two screws 12, 12A engaging with two grooves in the slide.

The slide 10 is held in its upper position by a return spring 13. On the opposite side of the device (Fig. 3) the framework carries a stop lever 14, pivoted at 15, against the end of which bears one of the lower pins of the mirror support, passing through its guide groove, under the action of the spring 13, which thus returns the mirror into its viewing position. The lever 14 is itself applied by a return spring 17, against a stop member, formed by an adjustable eccentric 16 held by a screw. The spring 17, is of sufficient strength to hold the lever against the eccentric 16 in spite of the force exerted by the lower pin under the action of the return spring 13 of the mirror support, in the viewing position.

The device operates as follows:

Just before photographing, the mirror support 3 is retracted by pressing the actuating knob 11. The rack and the pinions effect the raising of the levers b actuating the mirror, which move the latter by the central pins of the mirror support. The mirror is thus moved, by a pure rotation, up to its upper position, located outside the path of the luminous rays projected by the objective. A shutter of the "plate" type may be released after the mirror has been retracted.

When the knob 11 is released the mirror returns to its viewing position; the stop lever 14, by reason of the return spring 17, fulfils the part of a resilient stop, absorbing the shock transmitted to the mirror at the end of this return stroke. The adjustable eccentric 16, enables the viewing position of the mirror to be adjusted so that it reflects onto the frosted glass an exactly corresponding image, both as regards framing and clearness, to that which is then formed during the taking of the view on the sensitised layer.

When the objective carrying tube is retracted or telescoped into the interior of the apparatus, before packing the latter for example, the inner end of this tube bears against the lower edge of the mirror support and leads the latter into an extreme lower position. A stop provided on the objective support limits the telescoping movement of the latter in such a manner that the central and lower pins of the mirror support do not reach the end of the extension of their groove, for the purpose of avoiding any damage to the suspension or actuating members of the mirror. When the objective support is again advanced into the operative position of the objective, the lever 14 returns the mirror automatically into the viewing position.

In Figs. 5 to 7, the thick lines I, II, III, I', II', III', and I'', II'', III'' represent diagrammatically the three guides followed by the pins of the mirror support during the passage of the mirror from one to the other of its viewing and photographing positions. The broken lines show diagrammatically the characteristic positions of the mirror support and the thin lines the rays issuing from the respective centres, drawn from the axes of rotation on the plane of the drawing and bordering upon characteristic positions occupied by the pins of the mirror support. For effectively illustrating the pure rotation effected by the mirror, the angle at the centre corresponding with the rotation of each pin about the axis of rotation, is indicated respectively by alpha, beta and gamma in Figs. 5, 6 and 7.

According to Fig. 5 the mirror effects a pure rotation about an imaginary axis of which the position on the plan of the drawing is indicated at 4 during the retraction, whereas, during the telescoping of the objective, it effects a pure rotation about an axis of which the position on the plan of the drawing is indicated at 5.

According to the modification corresponding with Fig. 6, space may be gained in the axial direction of the objective by providing two pure successive rotations of the mirror during its retraction; firstly around an imaginary axis which may be located outside the apparatus and of which the position on the plan of the drawing is indicated at 4', centre of the concentric arcs of circles I', II' and III'; and secondly about an axis of which the position on the plan of the drawing is located at the upper end 18 of the arc of circle I'.

In the other modification, shown in Fig. 7, three guides or grooves I'', II'' and III'' are used having as common centre 4'', indicated on the plan of the drawing as the imaginary axis of rotation of the mirror. The grooves II'' and III'', are each extended as in Figs. 5 and 6, at their lower end by an arc of a circle centred at the corresponding end 5 of the guide of small radius whilst the guides I'' and III'' are each extended at their upper end by an arc of circle centred on the corresponding end 19 of the slide III'', 19 being thus the position, on the plan of the figure, of the axis of pure rotation effected by the mirror at the end of the retracting stroke.

I claim:

1. In a photographic apparatus, the combination, comprising, a framework, an objective support axially slidable in said framework, an objective carried by said support, a mirror support movable from a photographing to a viewing position in said framework, a reflex mirror on said support, manually operable means moving said mirror support between said positions, resilient means urging said operable means to move said mirror support toward the viewing position, a resiliently biased stop member on said framework and opposing and overcoming the urge of the resilient means, and means for adjusting the stop member and engaged by same under urge of the resilient bias.

2. A photographic apparatus according to claim 1, and also comprising, a pair of upper coaxial pins extending from opposite sides of said mirror support, guide means for each of said pins, a pair of lower pins extending from opposite sides of said mirror support and guided in said framework and urged by said resilient device against said yieldable stop with said mirror in the viewing position, and wherein said yieldable stop includes a lever pivoted to the framework and a spring urging said stop lever to a position limiting the movement of said mirror by said resilient device to the viewing position.

3. A photographic apparatus according to claim 1, and also comprising arcuate guide means for said lower pins and concentric about the ends of said guide means occupied by said upper pins when said mirror is in viewing position whereby the movement of the objective support into said framework causes said mirror support to swing beyond the viewing position and to overcome the resistance of said yieldable stop.

4. A photographic apparatus according to claim 1, and also comprising, guides in the sides of said framework concentric about an imaginary axis lying outside of said framework and guiding said mirror support during its movement from a viewing position to a photographic position, said guides comprising a first, second and third guide, extensions of said second and third guides concentric to the end of said first guide, said end being occupied by said mirror support when in viewing position and limiting the movement of said mirror support about the imaginary axis.

5. In a photographic apparatus the combination comprising a framework, a mirror support mounted in said framework, a "reflex" mirror mounted in said support, and pins on said support, said framework having lateral guides therein, said guides extending along concentric arcs of circles, said guides being engaged by said pins, the cooperation of the pins with the guides being such as to guide said mirror at least during a portion of its movement between its viewing position and its photographing position, so that said mirror follows a pure rotational movement about an imaginary axis which is fixed relatively to the apparatus and located outside the apparatus, a stop lever secured to said framework, and an adjustable stop on said framework, said lever cooperating with said stop so as to determine the viewing position of said mirror, at least one upper pin and at least one lower pin secured to said mirror support, the viewing position of said mirror being determined by the engagement of said upper pin with one end of its corresponding guide, and by said lower pin engaging with said stop lever, a return spring urging said upper pin against the end of its guide, and a second return spring secured at one end to said framework and at its other end to said lever and opposing and overcoming said first spring and urging the stop lever against the stop.

6. In a photographic apparatus the combination comprising a framework, a mirror support mounted in said framework, a "reflex" mirror mounted in said support, and pins on said support, said framework having lateral guides therein, said guides extending along concentric arcs of circles, said guides being engaged by said pins, the co-operation of the pins with the guides being such as to guide said mirror at least during a portion of its movement between its viewing position and its photographing position, so that said mirror follows a pure rotational movement about an imaginary axis which is fixed relatively to the apparatus and located outside the apparatus, a stop lever secured to said framework, and an adjustable stop on said framework, said lever co-operating with said stop so as to determine the viewing position of said mirror, an objective carrying tube capable of being moved into and out of said framework, at least one of said guides in each of the walls of said framework being extended beyond the point occupied by the mirror when in the viewing position, and a spring normally urging said lever against said stop, said objective support when entering said apparatus, coming into mechanical contact with the lower edge of said mirror support, said mirror support yielding to this action and moving said lever against the action of said spring.

7. In a photographic apparatus the combination comprising a framework, a mirror support mounted in said framework, a "reflex" mirror mounted in said support, and pins on said support, said framework having lateral walls and guides therein, said guides extending along concentric arcs of circles, said guides being engaged by said pins, the co-operation of the pins with the guides being such as to guide said mirror at least during a portion of its movement between its viewing position and its photographing position, so that said mirror follows a pure rotational movement about an imaginary axis which is fixed relatively to the apparatus and located outside the apparatus, said guides including a first guide and a second guide in arcs of concentric circles in each of the lateral walls of said framework, and at least a third concentric guide in one of said walls, said second guides and said third guide being each extended at each of their ends by an arc of a circle having its center at the corresponding ends of the said first guides.

8. In a photographic apparatus the combination comprising a framework, a mirror support mounted in said framework, a "reflex" mirror mounted in said support, and pins on said support, said framework having lateral walls and guides therein, said guides extending along concentric arcs of circles, said guides being engaged by said pins, the co-operation of the pins with the guides being such as to guide said mirror at least during a portion of its movement between its viewing position and its photographing position, so that said mirror follows a pure rotational movement about an imaginary axis which is fixed relatively to the apparatus and located outside the apparatus, said guides including a first guide, a second guide and a third guide in arcs of concentric circles in each of the lateral walls of said framework, said second guides and said third guides being each extended at one end by an arc of a circle having its center at the corresponding end of said first guides, said first guides and said second guides being each also extended at their other end by an arc of a circle having its center at the other end of said third guides.

GEORGES BAER.

REFERENCES CITED

The following references are of record in the file of this patent:

UNITED STATES PATENTS

| Number | Name | Date |
| --- | --- | --- |
| 1,295,395 | Wade | Feb. 25, 1919 |
| 1,980,546 | Petit et al. | Nov. 13, 1934 |
| 2,352,177 | Bolsey | June 27, 1944 |

FOREIGN PATENTS

| Number | Country | Date |
| --- | --- | --- |
| 18,815 | Great Britain | July 6, 1905 |
| 427,307 | Germany | Mar. 30, 1926 |
| 782,058 | France | Mar. 11, 1935 |